US011952512B2

(12) United States Patent
Beatty (10) Patent No.: US 11,952,512 B2
(45) Date of Patent: Apr. 9, 2024

(54) CHEMICAL PROCESS FOR STRIPPING SURFACES

(71) Applicant: The Boeing Company, Chicago, IL (US)

(72) Inventor: Michael C. Beatty, Long Beach, CA (US)

(73) Assignee: THE BOEING COMPANY, Arlington, VA (US)

( * ) Notice: Subject to any disclaimer, the term of this patent is extended or adjusted under 35 U.S.C. 154(b) by 837 days.

(21) Appl. No.: 16/870,698

(22) Filed: May 8, 2020

(65) Prior Publication Data

US 2021/0348006 A1 Nov. 11, 2021

(51) Int. Cl.
*B64F 5/40* (2017.01)
*B05D 3/10* (2006.01)
*C09D 5/34* (2006.01)
*C09D 9/00* (2006.01)
*C09D 181/04* (2006.01)

(52) U.S. Cl.
CPC ............ *C09D 9/005* (2013.01); *B05D 3/102* (2013.01); *B05D 3/104* (2013.01); *C09D 5/34* (2013.01); *C09D 181/04* (2013.01); *B64F 5/40* (2017.01)

(58) Field of Classification Search
CPC ........ B05D 3/002; B05D 3/102; B05D 5/005; B05D 7/00; B05D 7/14; B05D 7/24; B05D 7/26; B05D 7/50; B05D 7/52; B05D 2350/00; B05D 3/104; B05B 12/20; B05B 12/26; B05B 12/265; B05B 12/32
USPC ....... 427/154, 156, 259, 267, 270, 271, 272, 427/273, 282, 287, 327, 331, 337, 340, 427/401, 407.1; 134/38
See application file for complete search history.

(56) References Cited

U.S. PATENT DOCUMENTS

| 5,721,204 | A | * | 2/1998 | Maxwell | ................ C11D 7/262 510/206 |
| 5,728,666 | A | * | 3/1998 | Vitomir | ................ C11D 3/2034 510/210 |
| 6,217,945 | B1 | * | 4/2001 | Fowler | ..................... B05D 5/00 427/156 |
| 8,481,884 | B2 | * | 7/2013 | Bausen | ..................... B64F 5/10 219/121.85 |
| 8,545,943 | B2 | | 10/2013 | Frankenberger et al. | |

(Continued)

FOREIGN PATENT DOCUMENTS

| GB | 2486736 A | * | 6/2012 | ............. B05B 12/24 |
| WO | WO-9932564 A1 | * | 7/1999 | ............... C09D 9/00 |

OTHER PUBLICATIONS

Thixoflex Orange (TF2219) and Thixoflex Gray (TG2010 or TG8498) Product Information Sheet, 18 pages, coped from webpage May 7, 2020. (Year: 2020).*

(Continued)

*Primary Examiner* — William P Fletcher, III
(74) *Attorney, Agent, or Firm* — MH2 Technology Law Group LLP (57) ABSTRACT

A method of chemically stripping a surface is described. The method comprises applying a sealant to at least a portion of a surface of an object, the surface comprising a coating and one or more ingression points, the sealant filling the one or more ingression points to form a sealed surface. The method further comprises applying a stripping agent to the sealed surface to remove at least a portion of the coating to form a stripped surface.

21 Claims, 4 Drawing Sheets

(56) References Cited

U.S. PATENT DOCUMENTS

| | | | |
|---|---|---|---|
| 9,404,206 | B2 | 8/2016 | Meir |
| 9,452,616 | B1 | 9/2016 | Mathis et al. |
| 9,573,350 | B2 | 2/2017 | Hallbritter |
| 9,845,162 | B2 | 12/2017 | Campbell, Jr. |
| 9,845,556 | B2 | 12/2017 | Meure et al. |
| 10,184,813 | B2 | 1/2019 | Crothers et al. |
| 10,307,788 | B2 | 6/2019 | Arthur et al. |
| 10,369,679 | B2 | 8/2019 | Moriarty et al. |
| 2007/0049510 | A1* | 3/2007 | Fujii .................. C09D 9/00 510/201 |
| 2016/0062205 | A1 | 3/2016 | Bernhardt |
| 2018/0345646 | A1 | 12/2018 | Westren et al. |

OTHER PUBLICATIONS

Screen capture from YouTube video clip entitled "Official Av-DEC Thixoflex Black TG3212 Installation and Removal," 2 pages, uploaded on Dec. 17, 2020 by user "Av-DEC Injectables". Retrieved from Internet: <https://www.youtube.com/watch?v=J_BP4vuHCXs>. (Year: 2020).*

Paste, Hawley's Condensed Chemical Dictionary 876 (11th ed. 1987) (Year: 1987).*

Immediately, Oxford English Dictionary, https://www.oed.com/search/dictionary/?scope=Entries&q=immediately (last visited Jan. 24, 2024). (Year: 2024).*

Av-DEC, "Application Instructions for Av-DEC Two Part Sealants—200cc Cartridges," information sheet, Aviation Devices & Electronic Components, LLC, 1 page. Downloaded from web on May 7, 2020.

Av-DEC, "Thixoflex Orange & Thixoflex Gray" Product Information Sheet, 2 pages. Downloaded from web on May 7, 2020.

Av-DEC, Application Instructions for Av-DEC Two Part Sealants-50cc Cartridges, information sheet, Aviation Devices & Electronic Components, LLC, 1 page. Downloaded from web on May 7, 2020.

Thixoflex Orange (TF2219) and Thixoflex Gray (TG2010 or TG8498) Product Information Sheet, 18 pages, copied from webpage May 7, 2020.

Thixoflex Orange (TF2219) & Thixoflex Gray (TG2010 or TG8498) Product Information Sheet, 7 pages, downloaded on May 7, 2020.

* cited by examiner

FIG. 4

CHEMICAL PROCESS FOR STRIPPING SURFACES

GOVERNMENT RIGHTS

This invention was made with government support under FA8526-12-D-0001 DO FA8526-16-F-0011 awarded by the United Stated Air Force. The government has certain rights in the invention.

FIELD OF THE DISCLOSURE

The present disclosure is directed to a method for chemically stripping a surface.

BACKGROUND

Depaint and repaint processes are conventionally used to refresh the finishes on aircraft. These are standard maintenance actions performed every few years for corrosion protection and appearance. Existing depaint processes involve chemical stripping of paint from a composite or metal structure of an aircraft. Prior to applying a chemical stripping agent, the process includes masking with an aluminum-backed masking tape. The tape is used to cover aircraft seams to prevent chemical stripper ingression into the aircraft, such as around doors and access panels. Masking using tape is problematic in that it increases cost and does not allow stripping of paint in the areas proximate the seams that are covered by the tape.

Composite surfaces are often not chemically depainted due to concerns of the chemical stripping agent causing damage to the composite resin matrix. A small number of aircraft or detail parts have chemical stripper allowances. However, a stripped composite surface is readily susceptible to UV damage and requires protection. Existing solutions rely on a series of coatings to provide protection. For instance, current solutions add a special barrier coating on top of a composite surfacer layer and then tailor a chemical stripper to work with that barrier coating. For example, a typical composite barrier coating used on conventional airliners is an intermediate coating applied after the surfacer layer, but before primer and topcoat. During the chemical stripping process the barrier coat is resistant to the chemical stripper and prevents damage to the underlying composite.

There is a need in the art for materials and processes that can provide more efficient and/or less costly depaint procedures.

SUMMARY

The present disclosure is directed to a method of chemically stripping a surface. The method comprises applying a sealant to at least a portion of a surface of an object, the surface comprising a coating and one or more ingression points, the sealant filling the one or more ingression points to form a sealed surface. The method further comprises applying a stripping agent to the sealed surface to remove at least a portion of the coating to form a stripped surface.

The present disclosure is also directed to a method of chemically stripping a surface of an aircraft. The method comprises applying a sealant to at least a portion of a surface of the aircraft, the surface comprising a coating and one or more ingression points. The sealant fills the ingression points to form a sealed surface. A stripping agent is applied to the sealed surface to remove at least a portion of the coating to form a stripped surface. The stripped surface is coated with a surfacer layer.

The present disclosure is directed to a method of employing a surfacer as a barrier layer when chemically stripping a surface of a composite part. The method comprises providing a composite part comprising a surfacer layer between the composite part and an outer layer disposed on the composite part. A stripping agent is applied to a surface of the outer layer thereby removing at least a portion of the outer layer to expose the surfacer layer. The surfacer layer is not removed to expose the composite, the surfacer layer thereby protecting the composite part from the stripped agent.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The process of the present disclosure uses a temporary sealant to fill gaps or ingression points, including small gaps or ingression points that are potential areas of ingression into the aircraft. These gaps may be present, for example, around access panels and doors. The sealant allows a subsequent chemical stripping process to remove all coatings right up to the gaps or seams. The chosen sealant is chemically resistant to the stripping agent, and yet is easily removed following the stripping process. The present disclosure optionally employs a surfacer layer which acts as both in-process protection and a subsequent barrier for future stripping processes (e.g., future depaints). The surfacer layer is resistant to current off-the-shelf chemical strippers, which allows for easier integration into existing processes and eliminates the need for a separate barrier coating. The process of the present disclosure can save significant costs by reducing or eliminating the need for taping prior to stripping and/or by eliminating the need for the separate barrier layer.

Figure 1:
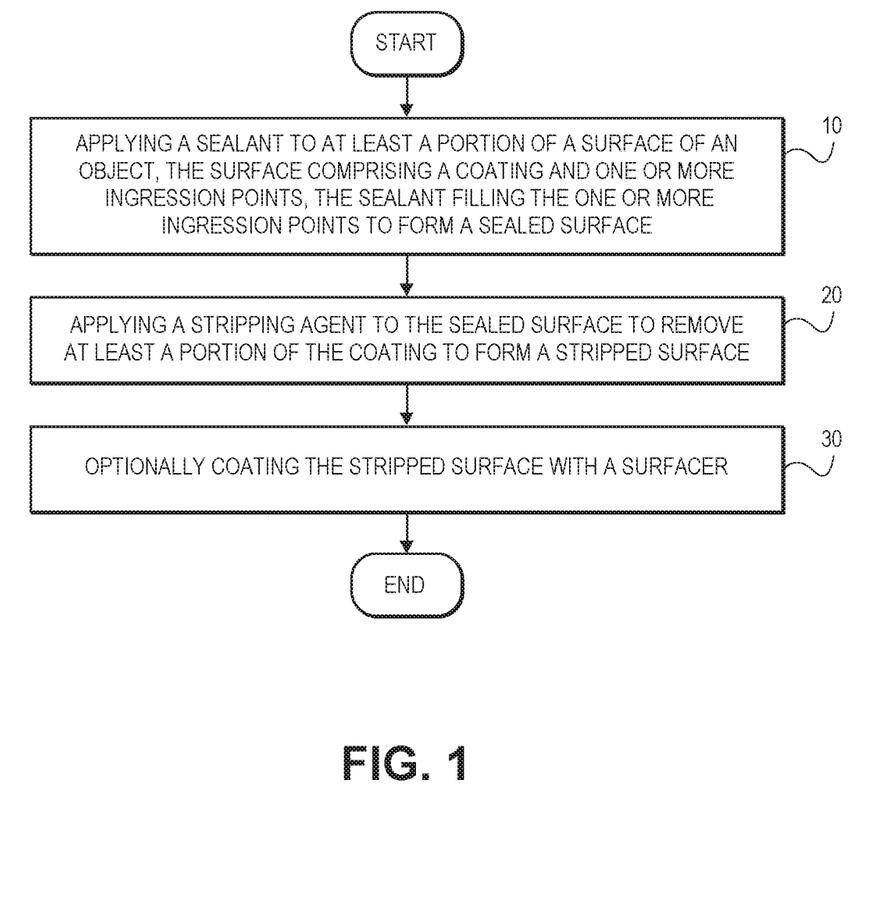
FIG. 1 is a flow chart of a method of stripping a surface, according to an aspect of the present disclosure.

The present disclosure is directed to a method of chemically stripping a surface. A flow chart of the method is shown in FIG. 1. Referring to 10 of FIG. 1, the method comprises applying a sealant to at least a portion of a surface of an object. The surface comprises a coating and one or more ingression points. The sealant fills the ingression points to form a sealed surface. As shown at 20 of the flow chart of FIG. 1, a stripping agent is applied to the sealed surface to remove at least a portion of the coating to form a stripped surface. The stripped surface can optionally be coated with a surfacer layer, as at 30 of FIG. 1.

Figure 2A:
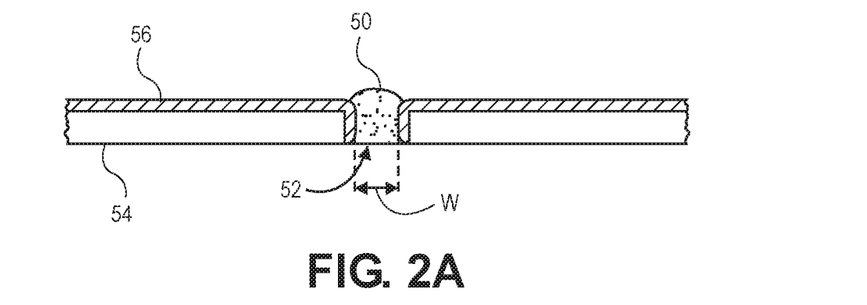
FIG. 2A illustrates a schematic cross-section of a sealant filling an ingression point on the surface of an object, according to an aspect of the present disclosure.
Figure 3:
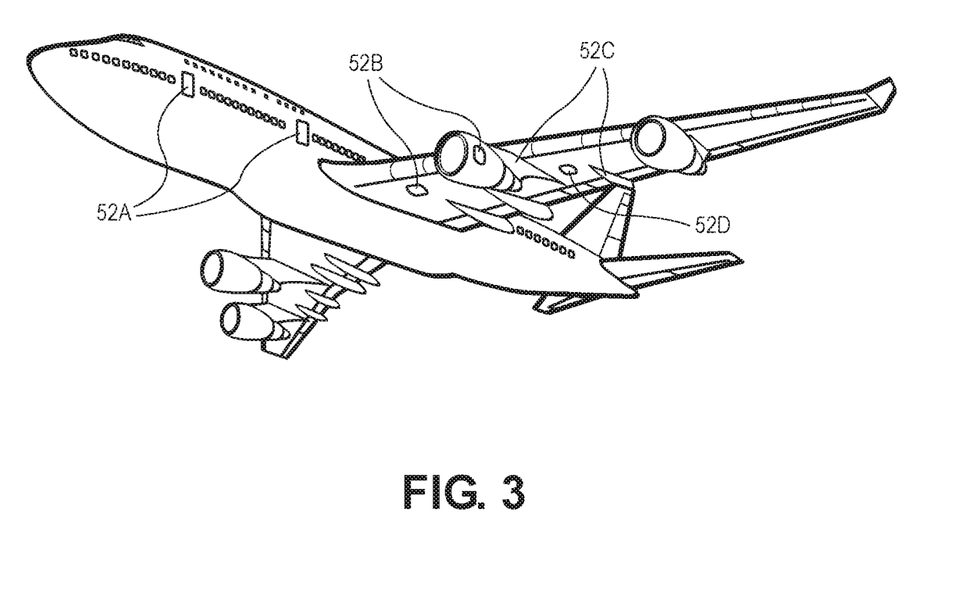
FIG. 3 illustrates an aircraft showing some possible ingression points where sealant can be applied, according to an aspect of the present disclosure.

The sealant can be a low adhesion sealant that is applied in the form of a thixotropic paste and then allowed to cure to form an elastic polymer. An example illustration of a low adhesion sealant 50 filling an ingression point 52 on the surface of an object 54 is shown in FIG. 2A. Object 54 comprises a coating 56 that is to be removed by a stripping agent, as describe in more detail below. The sealant 50 can be applied to fill any ingression point 52 through which it may be undesirable for the stripping agent to enter, such gaps or seams around doors 52A (FIG. 3), access panels 52B, fairings 52C, drain holes 52D, and other ingression points of an aircraft, and thereby form a sealed surface. The ingression points can have any suitable width, W, such as, for example, about 2 inches to about 0.005 inch, or about 1 inch to about 0.01 inch, or about ½ inch to about 0.05 inch, or about ⅜ inch to about 0.05 inch. In an example, the sealant is only applied to areas of the surface that encompass the ingression points and optionally portions of the surface immediately adjacent to the ingression points, such as 2 inches, 1 inch, or 0.5 inch or less from the ingression points.

The sealant 50 can be applied by any suitable technique. In an example, applying the sealant 50 comprises mixing a sealant precursor with a curing agent to form a sealant composition in the form of a paste. The sealant composition is then deposited using any suitable means, such as, for example, by applying a bead of sealant using a caulk gun or other dispenser, to fill the ingression point 52 on the surface of the object. The sealant composition can then be cured in any suitable manner, such as by air drying for a sufficient time to allow the curing agent to polymerize the sealant. Any other suitable method of curing can also be employed. Once cured, the sealant 50 forms an elastomeric compound.

In an example, the sealant 50 is a low adhesion sealant. Low adhesion sealants are generally known in the art and are defined herein to have an adhesion of 4 pounds or less per inch width, such as 0 to 4 pounds, or about 0.1 to about 3.8 pounds, as determined by the 180° sealant peel test. Using low adhesion sealants can reduce the residue remaining on the object surface after the sealant is removed. However, sealants with higher adhesion may also be employed, such as sealants having an adhesion of greater than 4 pounds per inch width. For example, sealants exhibiting an adhesion of up to about 5 pounds, or up to about 10 pounds per inch width or more can be employed, assuming they are sufficiently easy to remove without leaving large amounts of residue and/or damaging the surface.

The sealant is temporary and can be removed at any point following stripping. Sealant removal occurs with standard tools and/or by hand. After curing, the sealant has the property of allowing for easy physical removal of nearly all of the sealant from the surface of the object. For example, the sealant can exhibit at least 98% by weight removal to about 100% by weight removal from the surface of an object, where the amount of sealant removed is measured after the sealant is removed by hand using a technique similar to that employed for the 180° sealant peel test at room temperature (e.g., 22° C.), where the object surface is bare aluminum. While bare aluminum is specified for testing the amount of residue, the object can have a composite surface or any other object surface specified herein.

Any suitable type of low adhesion sealant that can maintain adhesion, be easily removed without leaving significant residue and withstand the stripping process so as to prevent ingression of the stripping agent can be employed. Examples include low adhesion sealants comprising a compound chosen from polysulfides, polyurethanes or combinations thereof. The sealant formulation can include a cure agent. In an example, the sealant is a two-part formulation comprising a low adhesion polysulfide and a cure agent. An example of a commercially available two-part, low adhesion polysulfide sealant is PR-1773 B-2, made by PPG Industries of Mojave, California. An example of a commercially available two-part, low adhesion polyurethane sealant is Thixoflex® Orange (TF2219), available from Av-DEC of Fort Worth, TX PR-1773 is qualified as an industry standard AMS-3284 sealant for use on aircraft.

Figure 2B:
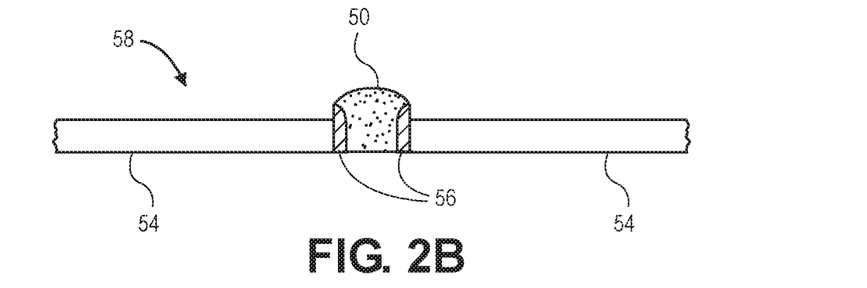
FIG. 2B illustrates a schematic cross-section of the low adhesion sealant filling the one or more ingression points as shown in FIG. 2B, where the surface has been stripped, according to an aspect of the present disclosure.

After applying the sealant 50, a stripping agent is applied to the sealed surface to remove at least a portion of the coating 56 to form a stripped surface 58, as shown in FIG. 2B. The stripping agent can comprise any chemical compound that will effectively remove the coating 56. In an example, the stripping agent comprises a paint remover. Suitable examples include paint removers comprising hydrogen peroxide and benzyl alcohol. An example of such a paint remover is B&B 9095, from Vantage Specialty Chemicals, Inc. of Chicago Illinois, which is a neutral, hydrogen peroxide activated, benzyl alcohol based viscous paint remover for aircraft exteriors.

In an example, the object 54 being stripped is an aircraft. The aircraft can be chosen from, for example, an airplane and a rotorcraft (e.g., a helicopter). For example, the object 54 can be a composite (e.g., a graphite/epoxy or fiberglass/epoxy composite) or metal part of an aircraft, such as an exterior part that has a coated layer to be removed. However, the advantages of the process described herein can be realized for any vehicle that goes through chemical stripping of a coating (e.g., a chemical depaint process).

In an example, the coating 56 being stripped is a paint coating, primer coating and/or other topcoat and/or specialty coatings, such as anti-static coating, rain erosion coating, or anti-chafe coatings. The process can be used on any coating compatible with the stripping agent, such as the benzyl alcohol/hydrogen peroxide stripping agent discussed herein above. As examples, this can include coatings comprising epoxies, polyurethanes, polysulfides or combinations thereof. As further examples, the coatings can include all MIL-PRF-23377 primer coatings and all MIL-PRF-85285 topcoats, which are approved for use by the U.S. military.

After the stripping process is completed, the method further comprises removing the sealant from the surface of the object. The sealant can be physically removed by any desired means. For example, sealant removal can occur with standard tools and/or by hand. As discussed in more detail above, the sealant has the property of allowing for easy physical removal of nearly all of the sealant from the surface of the object. The sealant can be removed before the optional surfacer layer is deposited, which will be described in more detail below.

Figure 2C:
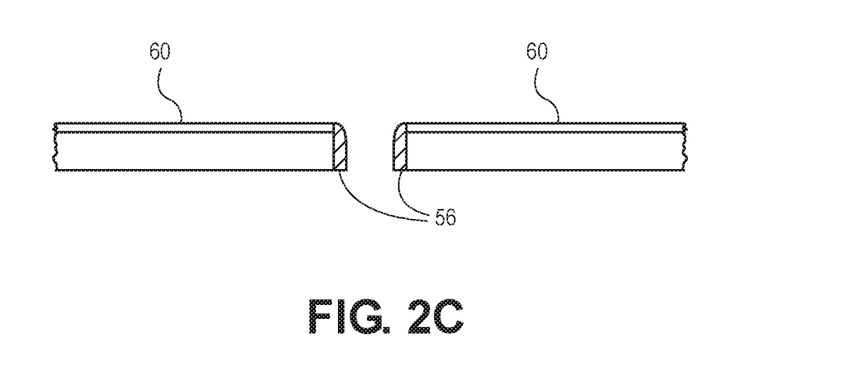
FIG. 2C illustrates a schematic cross-section of the ingression point as shown in FIG. 2B after a surfacer layer has been applied to the stripped surface and the low adhesion sealant has been removed, according to an aspect of the present disclosure.

Following stripping of the coating 56, the surface of the object 54 is optionally coated with a surfacer layer 60, as shown in FIG. 2C. In the case of removing paint, the stripping process (sometimes referred to as depaint) is usually carried out separately from repainting, with a time period of hours, days, weeks, or longer between the stripping process and the repainting process. The surfacer layer 60 is a coating that provides protection of the stripped parts from, for example, sun damage or other types of corrosion while the surface of the object remains without another protective coating, such as paint, between the stripping and recoating (e.g., repainting) process. A surfacer layer 60 can be particularly useful when the stripped object comprises a composite, such as composites employed as aircraft exteriors.

Surfacer layers, often referred to a "surfacers", are generally well known in the composite, and other industries, for covering up defects, such as pinholes, surface waviness, missing resin, and so forth in an object. Any composition that will adhere to the surface of the object and is suitable for covering defects can be employed as the surfacer layer 60. As examples, the surfacer layer 60 comprises a material chosen from polyurethanes, epoxies, or combinations thereof. One commercial example of a material that can be used for surfacer layer 60 is CA8680 from PPG, Inc. of Pittsburgh, Pennsylvania CA8680 is a sandable polyurethane coating with chemical and solvent resistance.

The method can further comprise coating the surface of the object after removing the sealant and applying the optional surfacer. Coating can occur immediately or at some future date. If an optional surfacer layer has been applied, the surfacer layer will protect the object from sun damage and/or corrosion until the coating process is completed. The coating process can comprise applying an optional primer coating directly on the surfacer layer and then applying a paint coating on the optional primer coating. Any of the other coatings described herein, such anti-static coatings, anti-chafe coatings, and rain erosion coatings can also be applied in addition to or in place of paint and/or primer coatings. In this example, a separate barrier layer, such as a conventional polyimide-based layer, is not disposed between the surfacer layer and the primer, paint or other coatings. In yet other examples, a separate barrier layer can be employed if desired.

Figure 4:
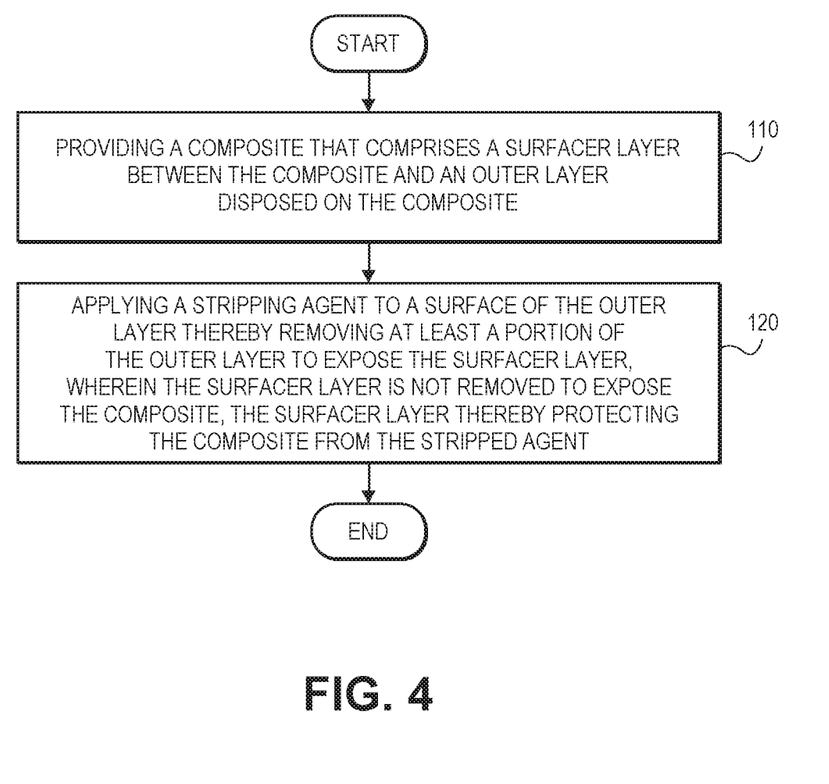
FIG. 4 is a flowchart of a method of employing a surfacer layer as a barrier layer when chemically stripping a surface of a composite part, according to an aspect of the present disclosure.

The present disclosure is also directed to a method of employing a surfacer layer as a barrier layer when chemically stripping a surface of a composite part. Referring to 110 of FIG. 4, the method comprises providing a composite part that comprises a surfacer layer between the composite part and an outer layer or layers (e.g., paint coatings, primer coatings, anti-static coatings, anti-chafe coatings, and rain erosion coatings, or a combination thereof) disposed on the composite part. The composite part can be, for example, a part for any of the aircrafts described herein, such as composite or metal aircraft parts having a painted surface on the exterior of the aircraft. The surfacer layer can comprise any of the materials described herein as suitable for use as a surfacer layer and can otherwise be the same as any of the surfacer layers described herein. Referring to 120 of FIG. 4, the stripping agent is applied to a surface of the outer layer thereby removing at least a portion of the outer layer to expose the surfacer layer. The surfacer layer is not removed to expose the composite part, the surfacer layer thereby protecting the composite part from the stripped agent. The stripping agent can be any of the stripping agents described herein, such as a stripping agent comprising hydrogen peroxide and benzyl alcohol.

The term "on" as used herein is defined broadly in the sense that it does not require direct physical contact. Thus, the outer layer of paint can be disposed on the composite even though a surfacer layer is disposed between the composite part and layer of paint. The term "directly on" is defined to require directly physical contact. Applicants contemplate that every instance of the term "on" can be replaced with "directly on" in the present disclosure.

EXAMPLES

Two low adhesion sealants, PR-1773 B-2, made by PPG Industries and Thixoflex® Orange (TF2219), which are already known for general use on aircraft, were tested. Test procedures and results are discussed below.

Example 1A

The Thixoflex Orange Sealant was Applied to Fill ¼ and ⅛ inch slits cut into a repainted panel that had previously been coated with a SM905 surfacing film. The surface of the filled slits was then squeegeed and allowed to sit overnight. A stripping agent (B&B 9095, from Vantage Specialty Chemicals) was applied to the repainted panel so as to cover the filled slits and allowed to sit for 7 hours. The panels were scraped to remove paint at 7 hours and then scraped again at 8 hours. The panels were then rinsed to remove the stripping agent. No leaking was observed on the back of the panel either before or after rinsing for the Thixoflex Orange.

The Thixoflex Orange was removed using a spatula from the ⅛ inch slit immediately and from the ¼ inch slit after sitting over the weekend. In both cases the Thixoflex Orange was slightly tacky, could not be removed in a single piece and left some residue in the slit. The topcoat in the seam was intact, indicating good protection was achieved from the stripper. The residue can potentially be removed using Isopropyl alcohol if desired.

Beads of the Thixoflex Orange were also deposited on the surface of the repainted panel and allowed to cure overnight. The beads peeled off of the panel by hand with relative ease. Little or no residue was observed.

Example 1B

The PR-1773 sealant was applied to fill ¼ inch, ⅛ inch and 0.06 inch slits cut into the same repainted panel used in Example 1B, which showed some removal of the paint around the ¼ and ⅛ inch slits. The surfaces of the ⅛ inch and 0.06 inch filled slits were then squeegeed and allowed to sit overnight. A stripping agent (B&B 9095, from Vantage Specialty Chemicals) was applied to the repainted panel so as to cover the filled slits and allowed to sit for 4 hours. The panels were scraped to remove paint at 4 hours and then scraped again at 8 hours. The panels were then rinsed to remove the stripping agent. No leaking was observed on the back of the panel either before or after rinsing for the PR-1773 sealant.

The PR-1773 sealant was easily removed by hand from the ⅛ inch slit immediately and from the ¼ inch slit the next day. In both cases the PR-1773 sealant was not tacky, could be removed in a single piece and left small amounts of residue in the slit. Similar results were achieved for the 0.06 inch slit, except that the PR-1773 sealant was not able to be removed in one piece by hand due to its small diameter. The topcoat in the slot was intact, indicating good protection was achieved from the stripper. It was noted that the PR-1773 foamed when in contact with the stripper and some color transferred from the sealant to the SM905 surfacing film of the repainted panel.

Two beads (a smaller and a larger bead) of the PR-1773 sealant film were also deposited on the surface of the repainted panel and allowed to cure. The stripping agent was applied to a portion of the beads after curing. The beads peeled off of the panel by hand with relative ease. Small amounts of residue was observed.

Example 2A

One small and one large bead of Thixoflex Orange were deposited on a surface coated with DMS2104 primer coating and allowed to cure. A bead of Thixoflex Orange was deposited on a bare aluminum surface. The beads peeled off of both surface by hand with relative ease. Small amounts of residue were observed on both surfaces.

Example 2B

A large bead of PR-1773 was deposited on a surface coated with DMS2104 primer and allowed to cure. Another bead of PR-1773 was deposited on a bare aluminum surface. The beads peeled off both surfaces by hand with relative ease. A small amount of residue was observed on the aluminum, with little or no residue being observed on the primer coating.

In summary, both the PR-1773 B-2 and Thixoflex Orange sealants functioned effectively as a low adhesive sealant to block stripper from getting into ingression points. The PR-1773 left less residue and was generally easier to remove than the Thixoflex Orange sealant.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A method of chemically stripping a surface, the method comprising:
    applying a sealant to at least a portion of a surface of an object, the surface comprising a coating and one or more ingression points, the sealant filling the one or more ingression points to form a sealed surface; and
    applying a chemical stripping agent to the sealed surface to chemically remove at least a portion of the coating to form a stripped surface; and
    immediately coating the stripped surface with a surfacer layer after applying the chemical stripping agent;
    wherein the chemical stripping agent comprises hydrogen peroxide, benzyl alcohol, or a combination thereof;
    wherein the sealant is chemically resistant to the chemical stripping agent; and
    wherein applying the sealant comprises mixing a sealant precursor with a curing agent to form a sealant composition, depositing the sealant composition on at least a portion of the surface of the object, and allowing the sealant composition to cure while air drying.

2. The method of claim 1, wherein the sealant is a low adhesion sealant having an adhesion of 4 pounds or less per inch width, as determined by the 180° sealant peel test.

3. The method of claim 1, wherein the sealant comprises a compound chosen from polysulfides, polyurethanes or combinations thereof.

4. The method of claim 1, wherein the sealant comprises a polysulfide.

5. The method of claim 1, wherein the stripped surface comprises a composite and the surfacer layer comprises a material chosen from polyurethanes, epoxies or combinations thereof.

6. The method of claim 1, wherein the object is an aircraft.

7. The method of claim 6, wherein the aircraft is chosen from an airplane or a rotorcraft.

8. The method of claim 1, wherein the coating is a paint coating, primer coating, anti-static coating, rain erosion coating, anti-chafe coating or combination thereof.

9. The method of claim 1, further comprising removing the sealant from the surface of the object after applying the stripping agent.

10. The method of claim 9, further comprising coating the surface of the object after removing the sealant.

11. A method of chemically stripping a surface of an aircraft, the method comprising:
    applying a sealant to at least a portion of a surface of the aircraft, the surface comprising a coating and one or more ingression points, the sealant filling the one or more ingression points to form a sealed surface;
    applying a chemical stripping agent to the sealed surface to chemically remove at least a portion of the coating to form a stripped surface;
    immediately coating the stripped surface with a surfacer layer; and
    wherein the chemical stripping agent comprises hydrogen peroxide, benzyl alcohol, or a combination thereof;
    wherein the sealant is chemically resistant to the stripping agent; and wherein applying the sealant comprises mixing a sealant precursor with a curing agent to form a sealant composition, depositing the sealant composition on at least a portion of the surface of the aircraft, and allowing the sealant composition to cure while air drying.

12. The method of claim 11, further comprising removing the sealant from the surface of the aircraft after applying the stripping agent.

13. The method of claim 11, wherein the sealant comprises a compound chosen from polysulfides, polyurethanes or combinations thereof.

14. The method of claim 11, wherein the stripped surface comprises a composite and the surfacer layer comprises a material chosen from polyurethanes, epoxies or combinations thereof.

15. The method of claim 11, further comprising applying one or more coatings to the surface of the aircraft after coating the stripped surface with a surfacer layer, wherein the coatings are chosen from paint coatings, primer coatings, anti-static coatings, anti-chafe coatings, erosion coatings or combinations thereof.

16. The method of claim 15, wherein the applying one or more coatings comprising applying a primer coating directly on the surfacer layer and then applying a paint coating on the primer coating.

17. The method of claim 11, wherein a separate barrier layer is not disposed between the surfacer layer and the primer coating.

18. A method of employing a surfacer as a barrier layer when chemically stripping a surface of a composite part, the method comprising:

providing a composite part that comprises a surfacer layer between the composite part and an outer layer disposed on the composite part; and applying a chemical stripping agent to a surface of the outer layer thereby chemically removing at least a portion of the outer layer to expose the surfacer layer, wherein the surfacer layer is not removed to expose the composite, the surfacer layer thereby protecting the composite from the stripped agent;

wherein the chemical stripping agent comprises hydrogen peroxide, benzyl alcohol, or a combination thereof;

wherein the sealant is chemically resistant to the stripping agent; and wherein applying the surfacer layer comprises mixing a sealant precursor with a curing agent to form a sealant composition, depositing the sealant composition on at least a portion of the surface of the composite part, and allowing the sealant composition to cure while air drying.

19. The method of claim 18, wherein the composite part is an aircraft part.

20. The method of claim 18, wherein the outer layer comprises paint coatings, primer coatings, anti-static coatings, anti-chafe coatings, erosion coatings or combinations thereof.

21. The method of claim 18, wherein the sealant comprises a compound chosen from polysulfides, polyurethanes or combinations thereof.

* * * * *